Feb. 22, 1966   G. A. WALLACE ET AL   3,235,895
EXTENDABLE POWER-OPERATED RAMP
Filed Sept. 5, 1962   11 Sheets-Sheet 2
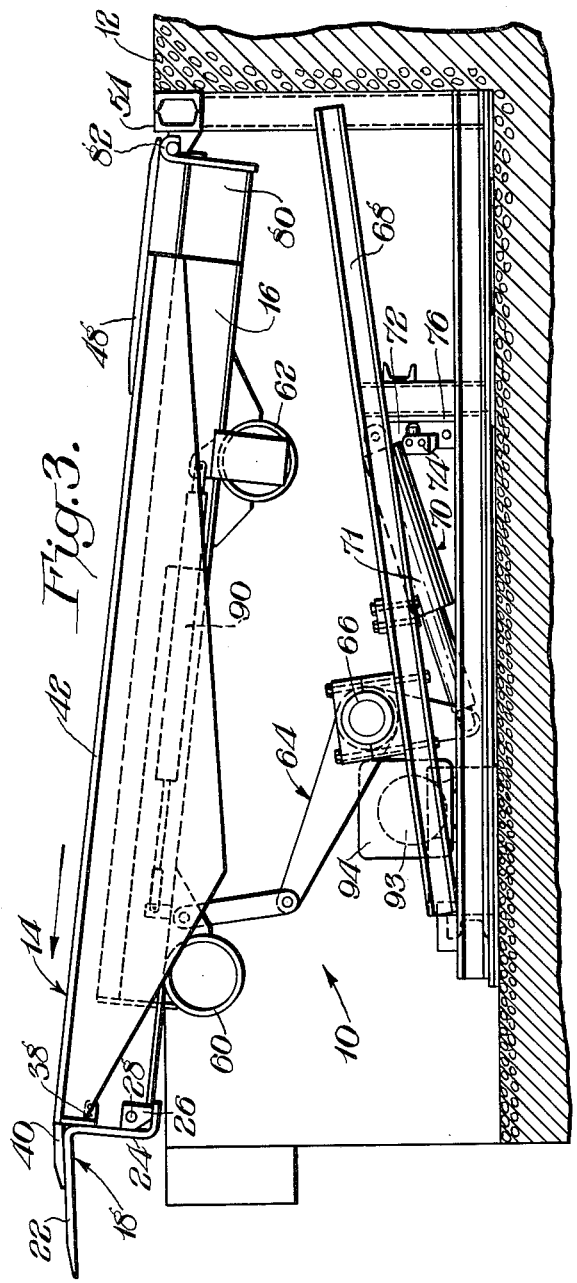
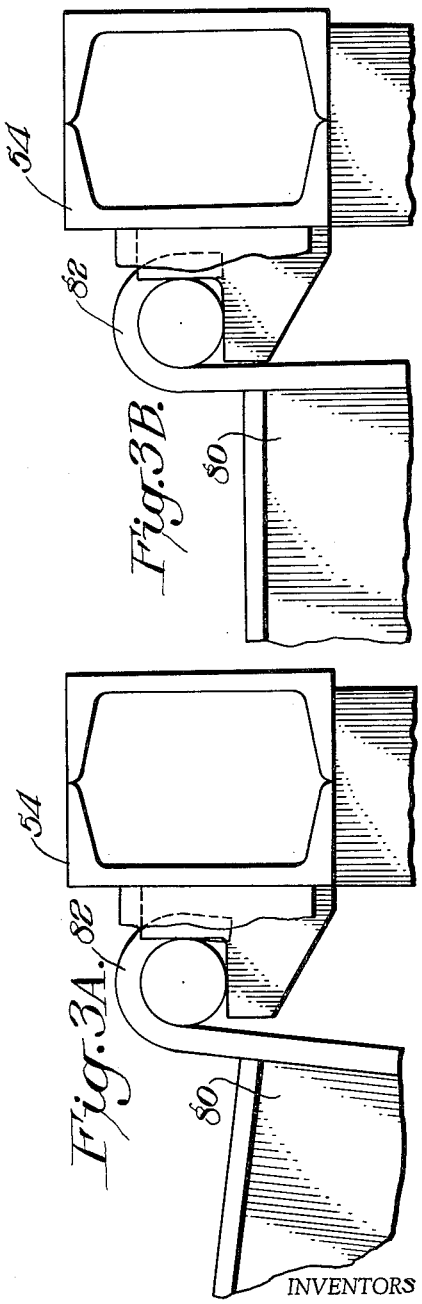
INVENTORS
Andrew T. Browne
George A. Wallace
BY Connolly and Hutz
ATTORNEYS

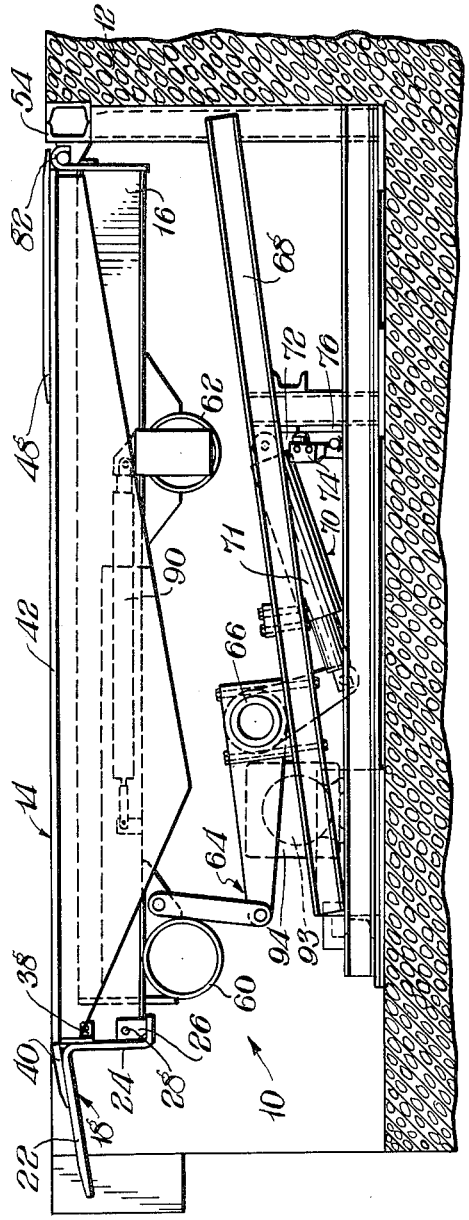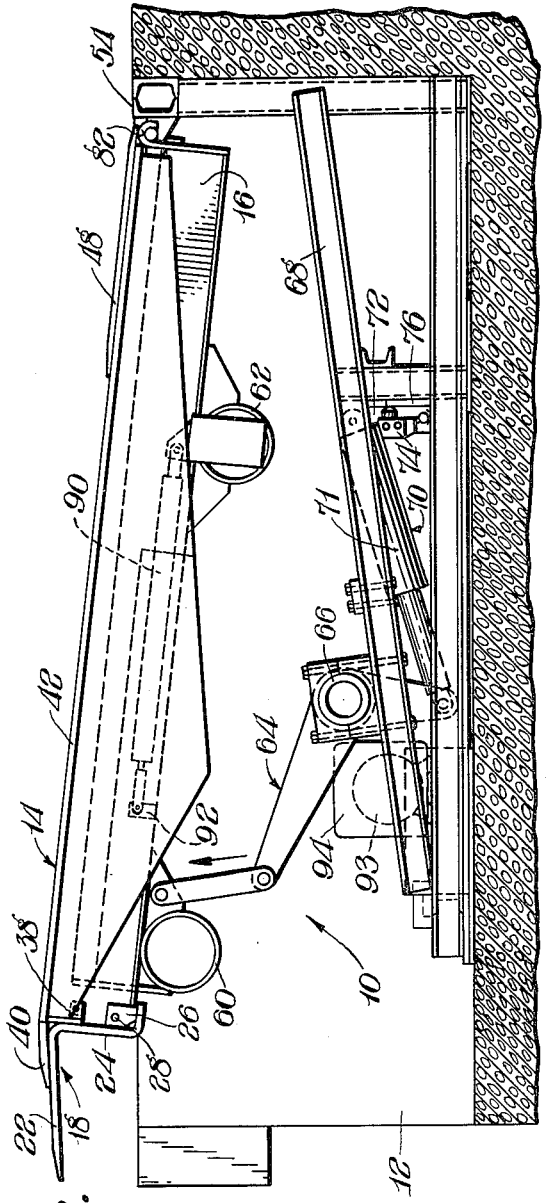

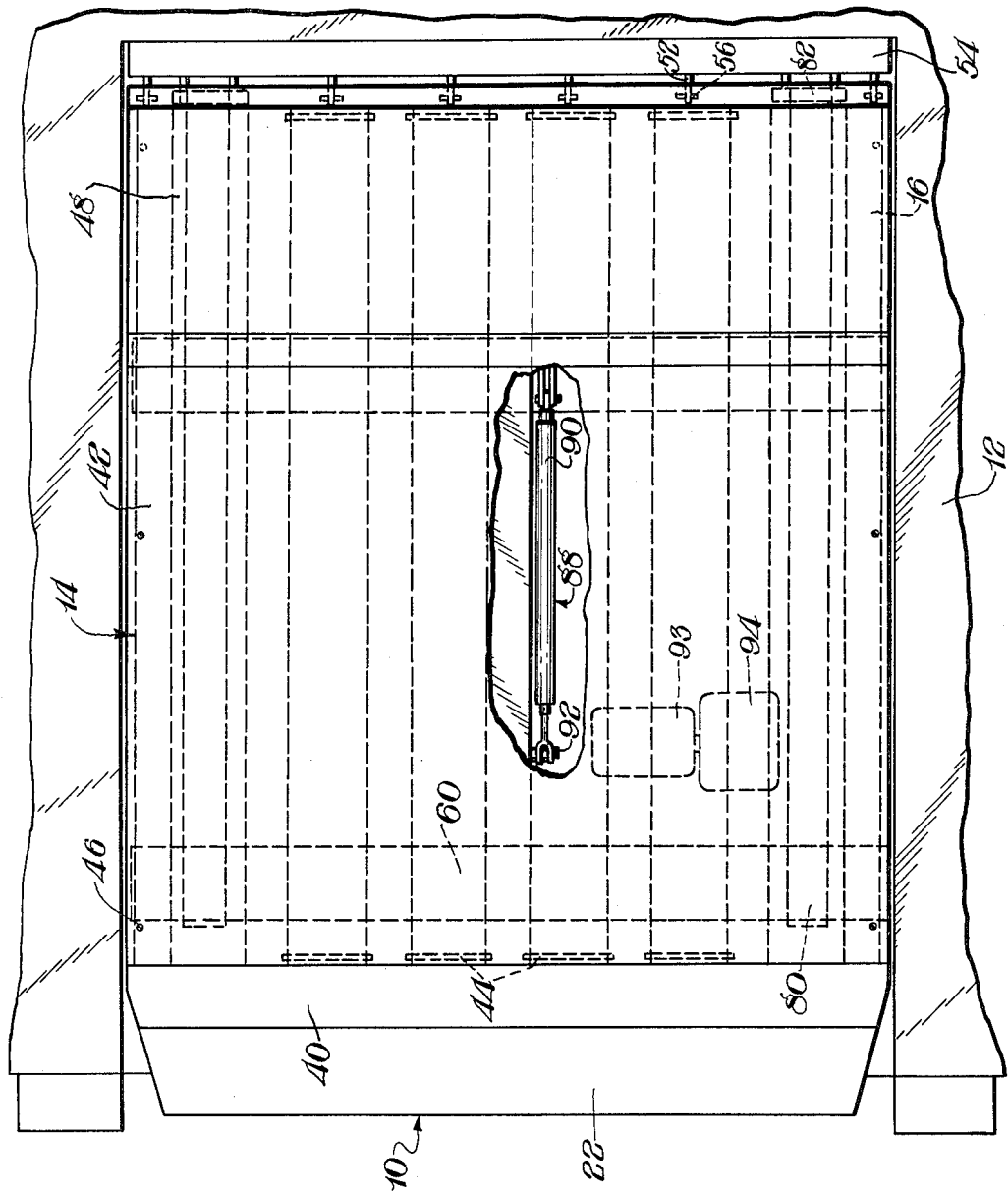

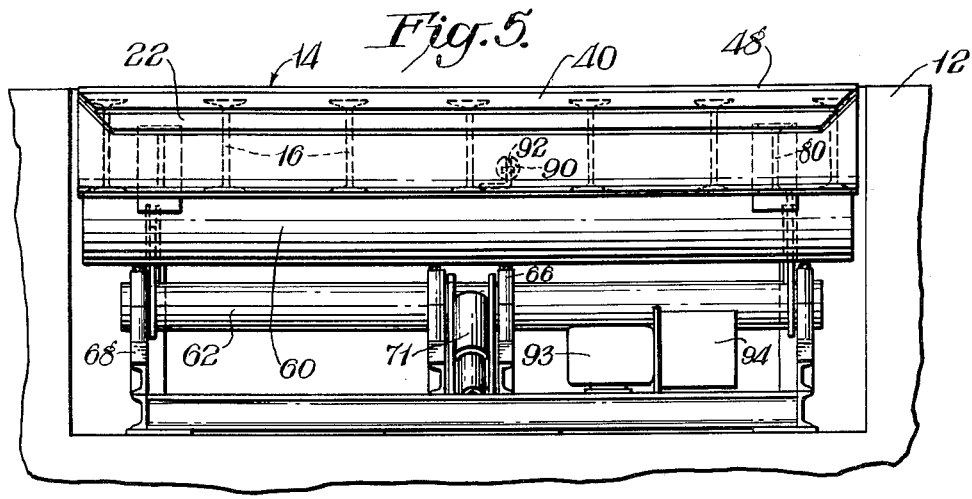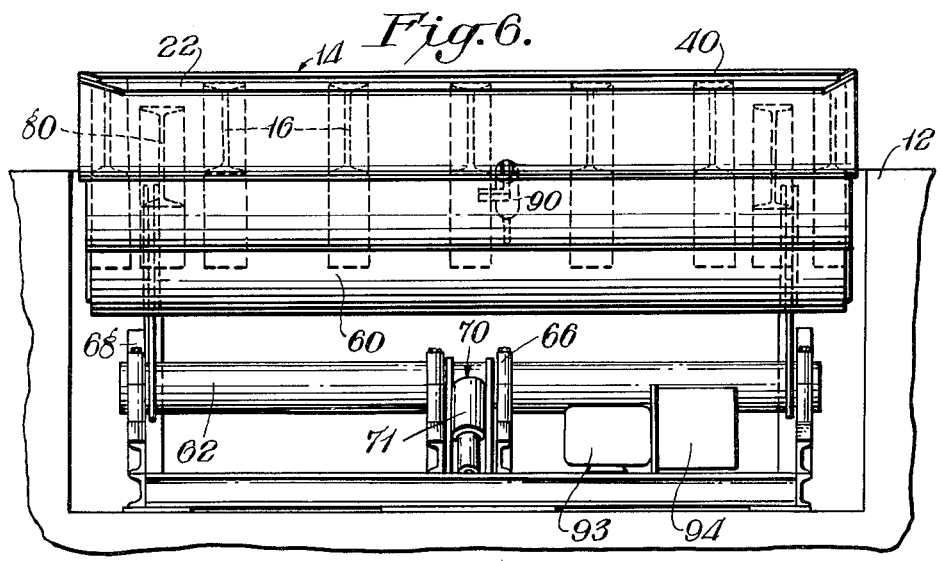

Feb. 22, 1966   G. A. WALLACE ET AL   3,235,895
EXTENDABLE POWER-OPERATED RAMP
Filed Sept. 5, 1962   11 Sheets-Sheet 5
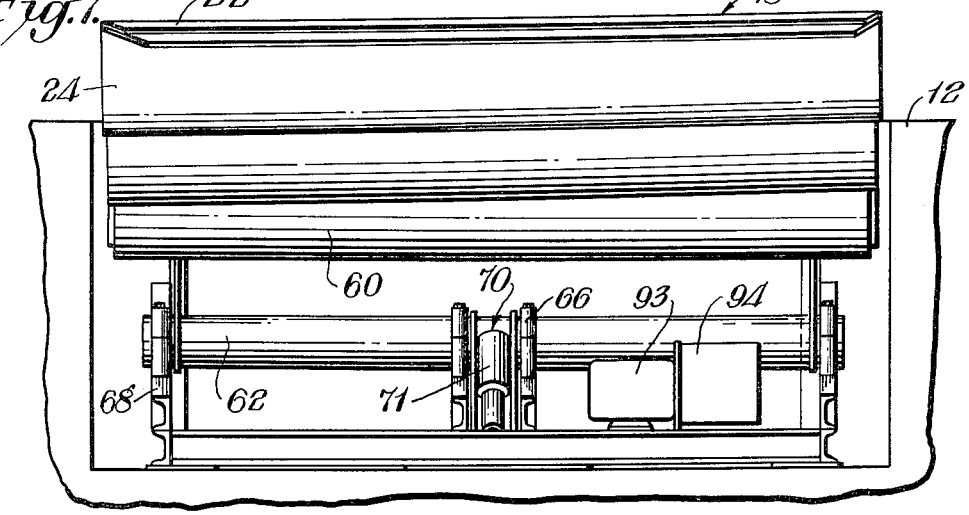
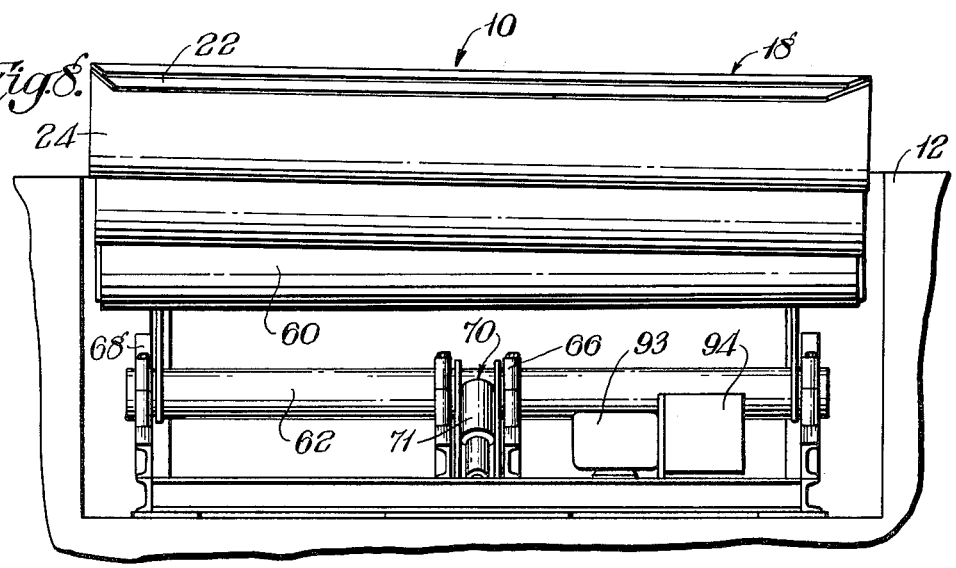
INVENTORS
Andrew T. Browne
George A. Wallace
BY Connolly and Hutz
ATTORNEYS

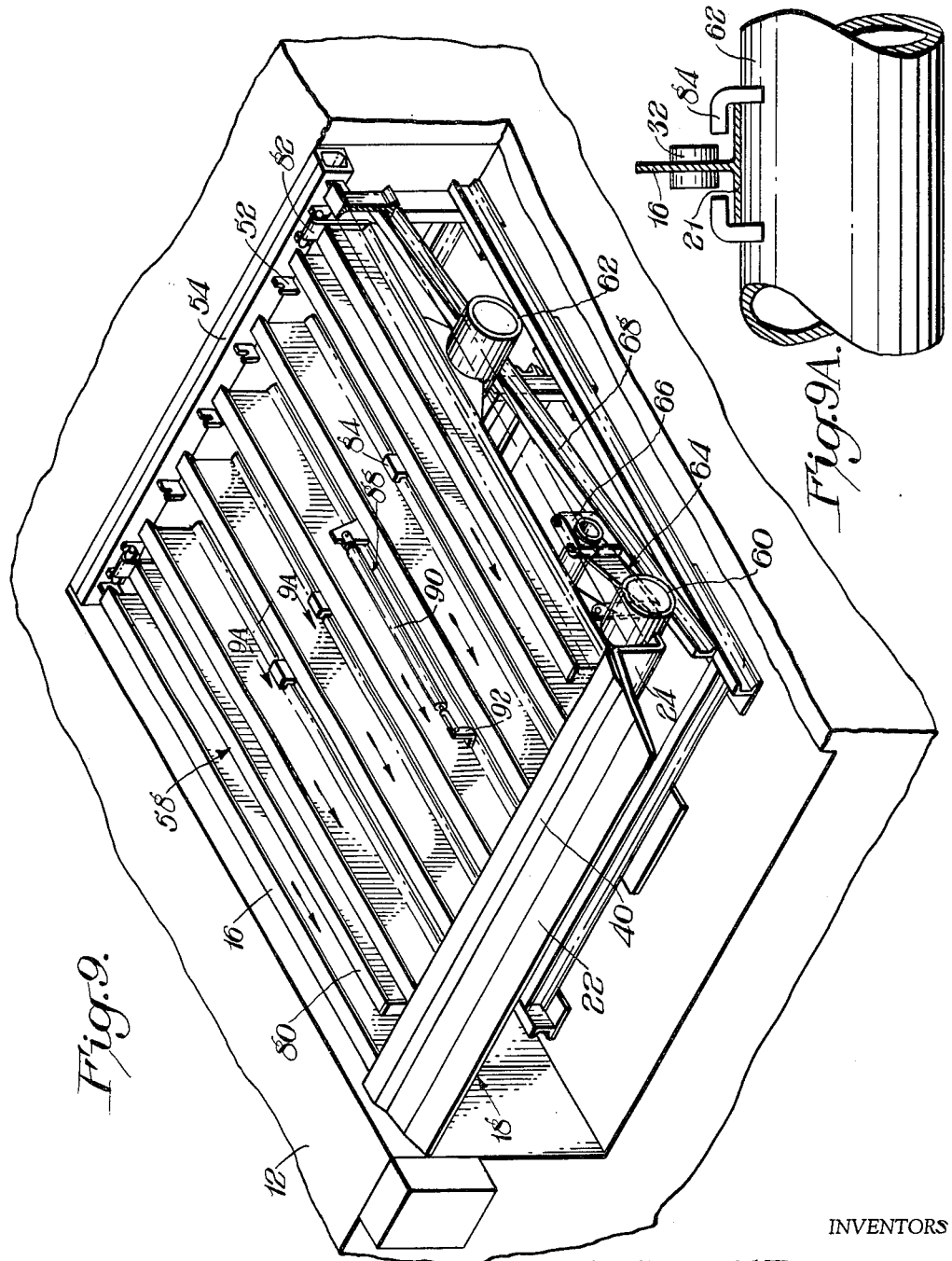

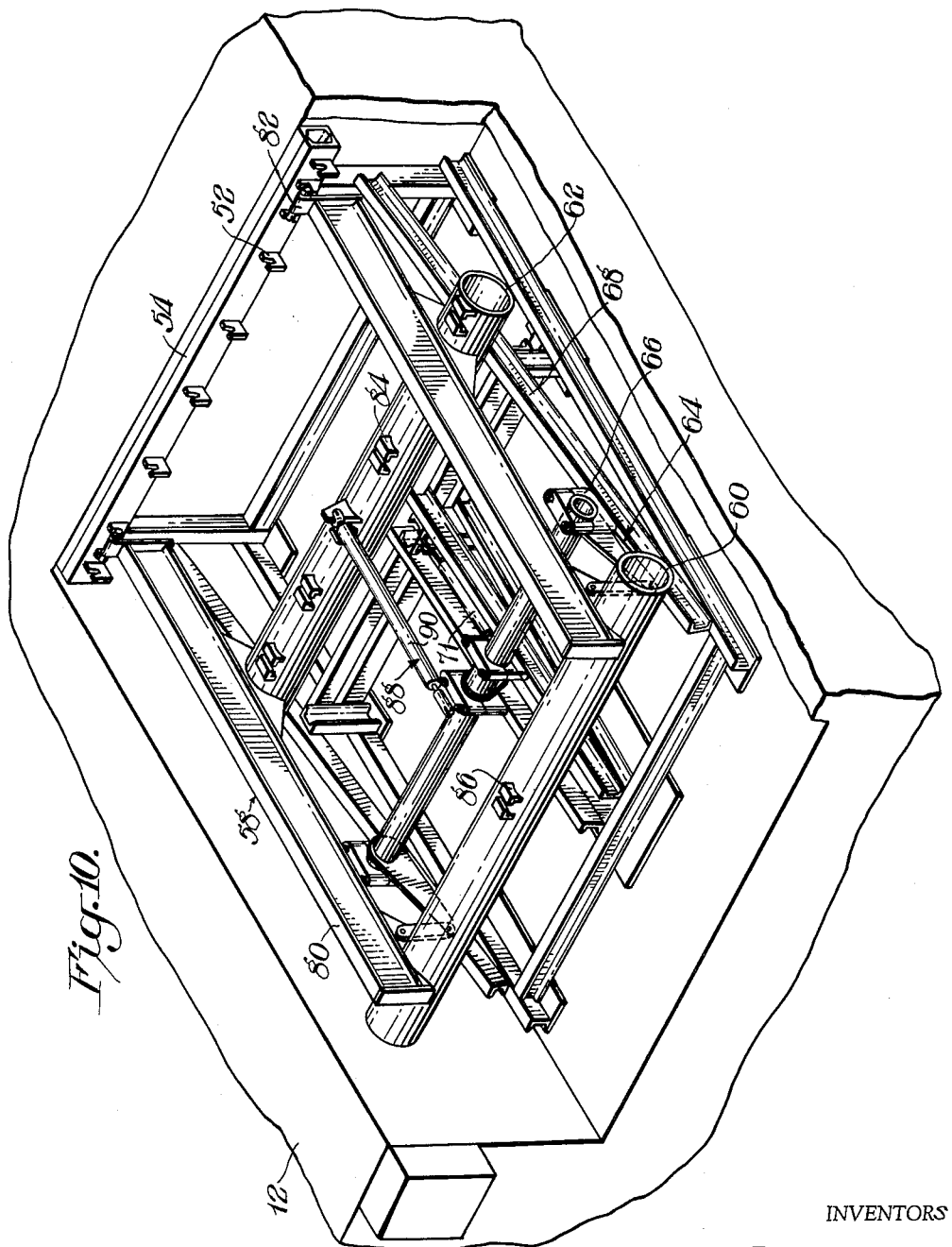

Feb. 22, 1966   G. A. WALLACE ET AL   3,235,895
EXTENDABLE POWER-OPERATED RAMP
Filed Sept. 5, 1962   11 Sheets-Sheet 8
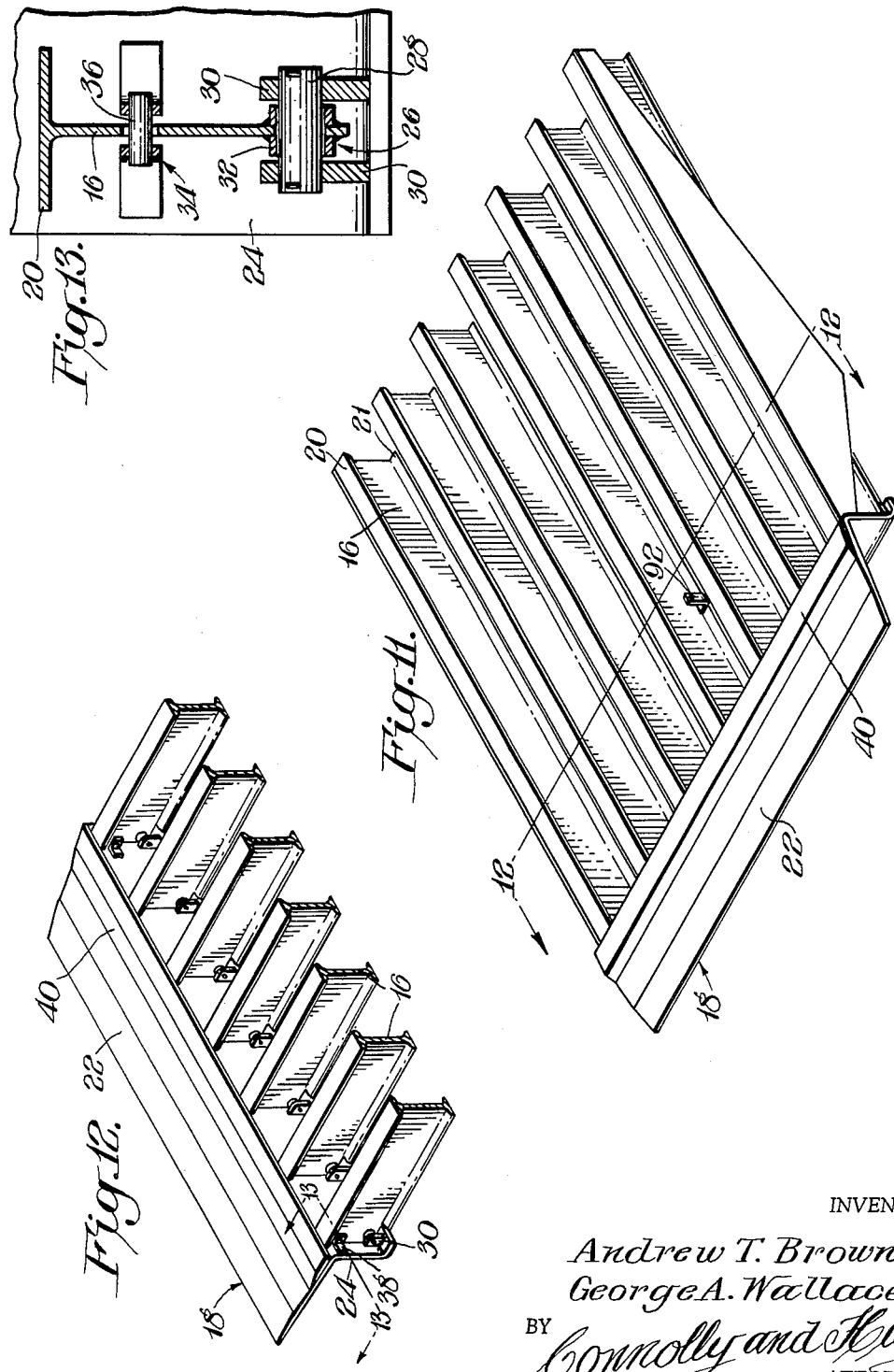
INVENTORS
Andrew T. Browne
George A. Wallace
BY Connolly and Hutz
ATTORNEYS

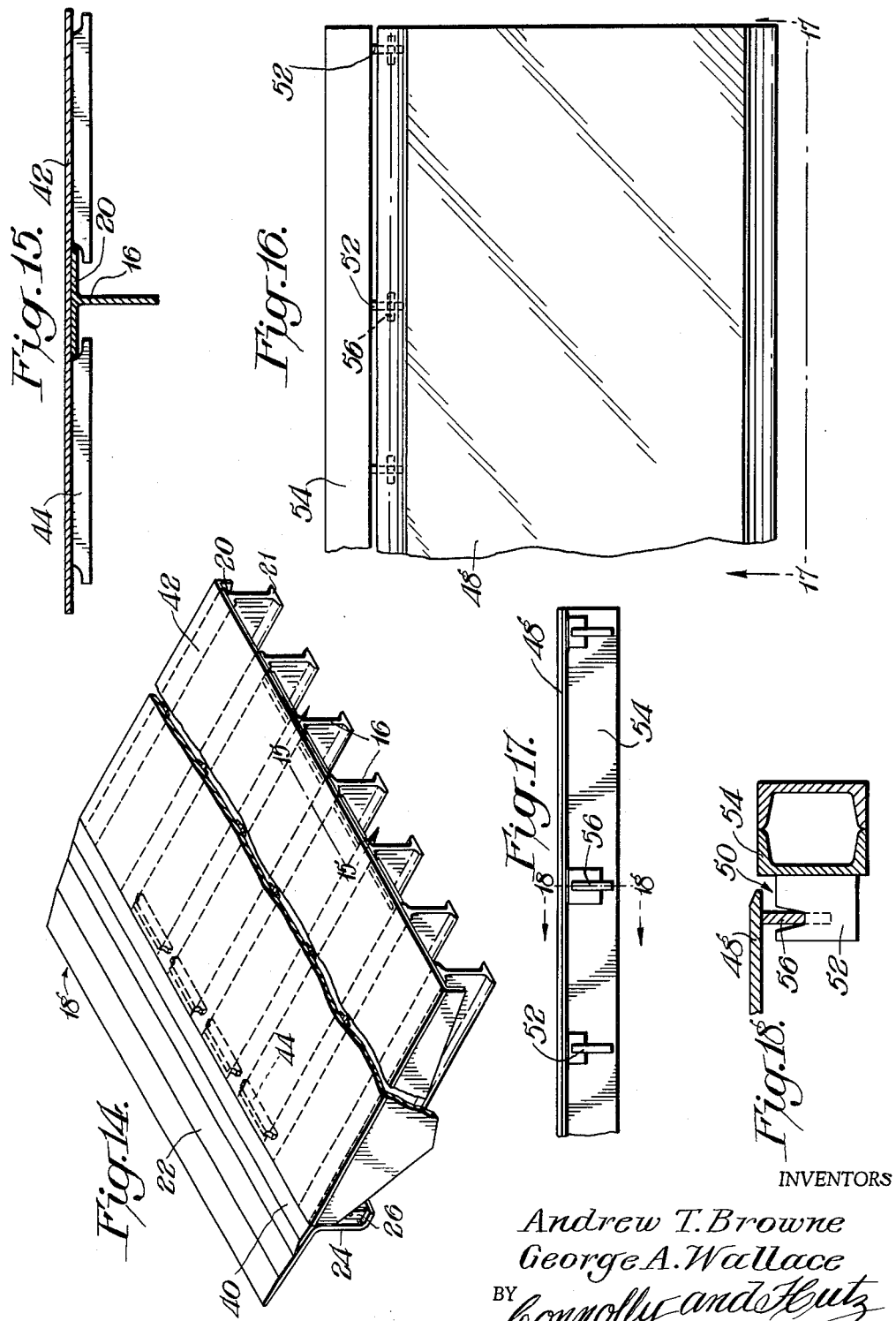

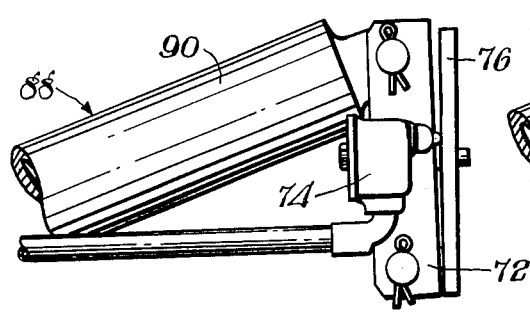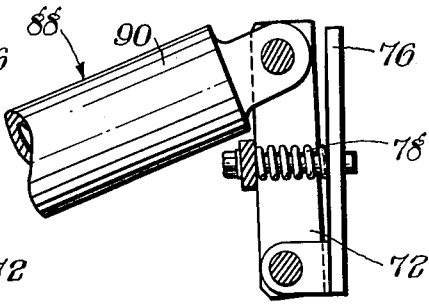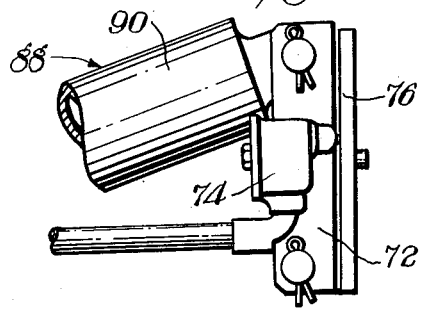

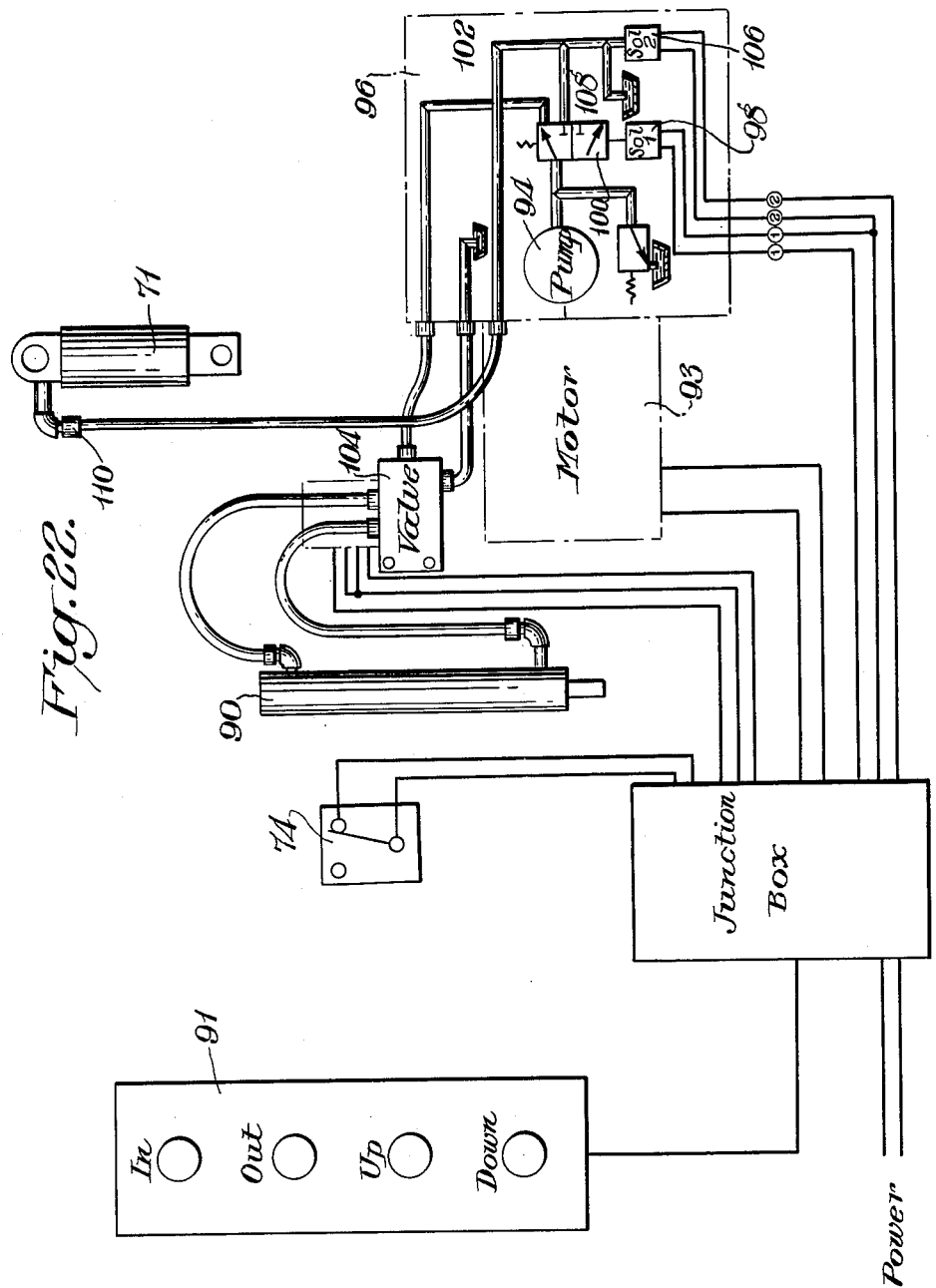

United States Patent Office 3,235,895
Patented Feb. 22, 1966

3,235,895
EXTENDABLE POWER-OPERATED RAMP
George A. Wallace, Philadelphia, and Andrew T. Browne, Springfield, Pa., assignors to Globe Hoist Company, Philadelphia, Pa., a corporation of Maryland
Filed Sept. 5, 1962, Ser. No. 221,515
9 Claims. (Cl. 14—71)

This invention relates to an extendable power-operated ramp for bridging the space between a loading dock and the bed of a truck parked next to it, and it more particularly relates to a ramp which can tilt from side to side to accommodate misalignment between the surface of a dock and a truck bed.

The beds of trucks being loaded from docks often are angularly misaligned from the horizontal level of the loading dock. It is therefore highly desirable for the surface of the ramp to twist to accommodate this misalignment with its rear end remaining in line with the loading dock and its front end conforming to the bed of the truck. Since these loading ramps are made of a relatively strong structural material such as steel for carrying the substantial loads transferred across them including the weight of loading vehicles such as fork lift trucks and the loads that they carry, it is quite difficult to provide an economical and dependable structure that accommodates the twisting action that the misalignment of its front and rear ends causes. It is particularly difficult to provide a flexible type of such a ramp having a relatively smooth deck surface.

An object of this invention is to provide dependable and economical structure for an extendable ramp having a smooth deck surface that can accommodate substantial angular misalignment between its front and rear ends.

In accordance with this invention a power-operated ramp for a loading dock includes a relatively flexible platform having a number of parallel longitudinal stringers which are relatively freely movable in a vertical direction and whose front ends are connected by loose pin means to a lip assembly thereby making the lip assembly flexibly adjustable to the level of a surface upon which it rests. A deck is loosely clipped to the platform stringers to cause it to adjust the position to which the stringers are moved to correspond to the level of the lip assembly. A supporting structure mounted under the platform is hinged to the edge of the loading dock, and power-operated elevating means reacts between the loading deck and the supporting structure for raising and lowering it and the platform resting upon it. A bridging plate is also hinged to the edge of the loading dock for bridging the space between the rear of the platform and the loading dock. A slotted coupling connects the rear ends of the stringers to a rear portion of the supporting structure to make the platform movable toward and away from the loading dock by reaction of a power-operated extending means between the said supporting structure and the platform, this making the ramp freely extendable and retractable without interfering with its flexibility.

The supporting structure may include front and rear lateral support bars mounted under corresponding portions of the platform with the front support bars secured across a pair of longitudinal beams which are hinged to the edge of the loading dock and disposed between a pair of stringers. An auxiliary slotted coupling may advantageously loosely hang the front support bar from one of the stringers to maintain the supporting structure slung closely under the platform when the weight of the platform is supported upon a bridged surface. The loose pins connecting the stringers to the lip may connect lower portions of each of the stringers to the lip with additional loose clips connecting only the tops of the two outside stringers to upper portions of the lip thereby providing an extremely flexible connection between lip and stringers. The deck may be flexibly connected to the stringers by loose clips welded under the deck and engaging the upper flanges of the stringers with the outside edges of the deck being pinned to the two outside stringers. This provides a remarkably flexible power elevated and extendable ramp having a smooth deck surface. The power-elevating means for such a ramp may be made to float when the lip rests upon a surface by mounting a switch upon a portion of the elevating linkage which is biased to the unactuated condition by a spring which is only overcome when the weight of the platform rests upon the power-elevating linkage.

Novel features and advantages of the present invention will become apparent to one skilled in the art from a reading of the following description in conjunction with the accompanying drawings wherein similar reference characters refer to similar parts and in which:

FIGS. 1, 2 and 3 are side views in elevation of an embodiment of this invention in various conditions of operation;

FIGS. 3A and 3B are enlarged cross-sectional views of hinge portions of the embodiment shown in FIGS. 1–3;

FIG. 4 is a plan view of the embodiment shown in FIG. 1;

FIGS. 5–6 are front views in elevation corresponding to the positions of the embodiment shown in FIGS. 1–2;

FIGS. 7 and 8 are front views in elevation of positions similar to that shown in FIG. 3 when the lip is inclined in one direction and the other with respect to the level of the loading dock;

FIG. 9 is a three-dimensional view of the ramp shown in FIGS. 1–3 with the deck plate removed;

FIG. 9A is a cross-sectional view taken through FIG. 9 along the line 9A—9A;

FIG. 10 is a three-dimensional view of the supporting structure portion of the ramp shown in FIG. 9;

FIG. 11 is a three-dimensional view of the platform section of the ramp shown in FIG. 9;

FIG. 12 is a cross-sectional view taken through FIG. 11 along the line 12—12;

FIG. 13 is a cross-sectional view taken through FIG. 12 along the line 13—13;

FIG. 14 is a three-dimensional view of the platform shown in FIG. 11 with deck installed;

FIG. 15 is a cross-sectional view taken through FIG. 14 along the line 15—15;

FIG. 16 is an enlarged plan view of the bridging plate portion of the ramp shown in FIG. 4;

FIG. 17 is a cross-sectional view taken through FIG. 16 along the line 17—17;

FIG. 18 is a cross-sectional view taken through FIG. 17 taken along the line 18—18;

FIGS. 19–21 are side views in elevation of control portions of the embodiment shown in FIGS. 1–4; and FIG. 22 is a schematic diagram of the control system for the embodiment shown in FIGS. 1–4.

In FIGS. 1–4 is shown a power-operated ramp 10 mounted upon a loading dock 12 for bridging the space between it and the bed of a truck (not shown). Ramp 10 includes a platform 14 having a number of parallel longitudinal stringers 16, shown in FIGS. 9 and 11 and 12, which are vertically movable with respect to each other. A lip assembly 18 extends across the front ends of stringers 16 which are for example made of I-beams with upper flanges 20 and lower flanges 21. Lip assembly 18 includes a substantially horizontal lip plate 22 and a relatively vertical front lip plate 24 to which stringers 16 are movably connected as shown in FIG. 12 by loose pin means 26 which connect the lower ends of stringers 16 with a lower portion of front lip plate 24. Loose pin means 26 as shown in detail in FIG. 13 include pins 28 secured to front lip plate 24 by brackets 30. Pins 28 which are for example one inch in diameter extend loosely through collars 32 in the webs of stringers 16, for example through holes in collars 32 which are 1 1/16" in diameter, to permit considerable misalignment to be accommodated within loose pin means 26.

A pair of upper loose pin connectors 34 connect the upper portions of the two outside stringers 16 to upper portions of front lip plate 24. As shown in FIG. 12, upper pin means 34 include pins 36 secured to lip plate 24 by brackets 38. Pins 36 are approximately 1/2" in diameter and extend through 7/8" diameter holes in the web of outside stringers 16 to provide an ample 3/8" clearance. This loose pin connection between the front ends of stringers 16 and lip assembly 18 makes the lip assembly flexibly adjustable to the level of a surface upon which it rests with the stringers movable in accordance with the level of the lip. A transition plate 40 as shown in FIGS. 1–3 is secured to the upper portion of assembly 18 to provide a smooth continuation from deck 42 mounted upon stringers 16 to the level of lip plate 22. As shown in FIGS. 4, 14 and 15, deck 42 is loosely clipped to stringers 16 by engagement of the free ends of T-bars 44 welded on the underside of deck 42 about upper flanges 20 of stringers 16. In FIG. 4 are also shown the location of six hold-down screws 46 which secure the two side edges of deck 42 to the two outside stringers 16. This loose clipping of the main portion of deck plate 42 to stringers 16 permits it to smoothly accommodate to any angle to which lip assembly 18 might be warped or twisted to the horizontal either to the right or left as shown in FIGS. 7 and 8. An ample clearance on the order of 1/8" between engaging portion of T-bar 44 and flanges 20 permits deck 42 to smoothly conform to any reasonable angular twisting of lip assembly 18 from the horizontal, such as as much as four inches in a six foot wide ramp.

As shown in FIGS. 1–4 and 16–18, bridging plate 48 is rotatably connected to the edge of the loading dock 12 by a detachable hinge assembly 50 incorporating grooved lugs 52 secured to the front of channelled bar 54 extending across the front of loading dock 12 into which are inserted correspondingly grooved tabs 56 upon the rear underside of bridge plate 48. As shown in FIG. 17, two of tabs 56 are longer than the others to provide secure lateral retention of bridging plate 48.

As shown in FIGS. 1–3, 9 and 10, platform 14 rests upon a supporting structure 58, which is best illustrated in FIG. 10. Supporting structure 58 includes front and rear lateral support bars 60 and 62. Front lateral support bar 60 is mounted upon a movable linkage 64 which is mounted to rotate upon a bearing 66 secured to stationary frame 68 of ramp 10. A power-operated means 70, including a piston and cylinder assembly 71 reacts between linkage 64 and frame 68 to which it is connected by a link 72, shown in FIGS. 19–21, to raise and lower ramp 10 between positions shown in FIGS. 1 and 2. A control switch 74 shown in FIGS. 19–21 is mounted upon link 72 to react against plate 76 which is part of frame 68. A spring 78 reacts between plate 76 and link 72 in a direction to move it and switch 74 away from plate 76 when the weight of ramp 10 is supported upon a surface (not shown) by resting lip assembly 18 upon that surface, for example when lip 18 is dropped downwardly from the position shown in FIG. 3 upon a truck bed (not shown). Switch 74 is therefore only actuated as shown in FIG. 21 when the weight of ramp 10 is supported through linkage 64 and switch 74 is therefore urged to the unactuated condition shown in FIGS. 19 and 20 by spring 78 when the weight of ramp 10 is supported free of linkage 64. Switch 74 when unactuated causes power-operated elevated means 70 to float as later described thereby permitting ramp 10 to freely follow the level of a truck bed upon which it is resting.

In FIG. 10 is also shown a pair of longitudinal beams 80 whose rear ends are rotatably connected to channel bar 54 at the front edge of loading dock 12 by hinges 82 which provide the principal rear hinges for ramp 10. These hinges 82 are illustrated in detail in FIGS. 3A and 3B. Rear lateral support bar 62, which is for example a tubular bar similar to bar 60, is secured below and across beams 80. Movement of front support bar 60 upwardly and downwardly thereupon causes corresponding movement of rear support bar 62 through beams 80 which rest freely upon the upper surface of front bar 60. Beams 80 extend under platform 14 between a pair of longitudinal stringers 16, for example outside pairs of stringers 16 as shown in FIG. 9.

As also shown in FIGS. 9 and 9A the lower flanges 21 of stringers 16 are loosely secured to the upper portion of rear lateral support bar 62 by slotted connectors 84 which permit stringers 16 to slide back and forth with respect to supporting structure 58. Slotted connectors 84 are relatively loose in a vertical direction providing approximately 1/4" vertical clearance to permit the front ends of stringers 16 to freely accommodate to the level of front lip assembly 18. An auxiliary sliding coupling 86 loosely connects the lower flange 21 of a central stringer 16 to front support bar 60 thereby loosely slinging the power-operated linkage 64 of support structure 58 to platform 14. This causes support structure 58 to closely follow platform 14 when it is supported upon a truck bed thereby maintaining it in position for catching platform 14 if the truck should suddenly drive away. The floating and actuating conditions of linkage 64 are provided by switch 74 mounted as shown in FIGS. 19–21.

As shown in FIGS. 4, 9 and 10, power-operated extending means 88 including a piston and cylinder assembly 90 reacts between rear support bar or tube 62 of supporting structure 58 and platform 14 through a clevis and bracket 92 secured as shown in FIG. 5 to a lower flange 21 of a central stringer 16 to move platform 14 back and forth with respect to support structure 58.

FIG. 22 shows a schematic diagram for the functional portions of ramp 10 including power-operated elevating means 70 and power-operated extending means 88. A series of four pushbuttons mounted on control box 91 provide the respectively marked "In, Out, Up and Down" positions of ramp 10 and switch 74 causes piston and cylinder assembly 71 to float when the weight of platform 14 is supported upon a bridged truck bed (not shown).

The illustrated structure permits a ramp, which is for example ten feet (when extended) long and six feet wide, to support approximately 20,000 lb. loads transported across it with considerable misalignment smoothly accommodated between the level of the loading dock platform and a truck bed. Despite a considerably twisted condition of platform 14 with respect to the level of loading dock 12 as shown in FIGS. 7 and 8 deck plate 42 bridges this transition in a remarkably smooth and dependable manner. Lip assembly 18 of the illustrated ramp 10 conforms to a slope of a truck bed that is out of level as much as four inches in the six foot width of ramp 10 without lifting it at the hinges.

The control system shown in FIG. 22 is operated in the following manner. The "Up" button starts motor 93 which drives pump 94 located inside of reservoir 96. Solenoid 98 is also energized to shift valve 100 to direct pump flow through check valve 102 to cylinder 71, which raises platform 14 through linkage 64 and accordingly raises ramp 10. When the "Up" button is released, motor 93 stops; and ramp 10 is locked into position by check valve 102. Valve 100 is spring returned to the position illustrated.

When the "Out" button is pressed, motor 93 is started; and one solenoid of four-way valve 104 is energized to direct pump flow to the rod end of cylinder 90. This pushes platform 14 out as far as desired up to approximately two feet. When the "Out" button is released, motor 93 is stopped; and the solenoid in valve 104 is de-energized thus hydraulically locking cylinder 90 in the position to which it is laterally extended. The "In" button directs fluid to the head end of cylinder 90 to retract the platform in an analogous manner.

The "Down" button energizes solenoid 106 to unlock lowering valve 108 thereby permitting ramp 10 to lower by gravity. Pipe connection 110 has a restricted passageway to control the speed of the drop of the ramp.

The function of switch 74 has been previously described in conjunction with FIGS. 19–21, and it is wired in parallel with the "Down" button to energize solenoid 106 when it closes thereby opening check valve 108 to connect cylinder 71 to the storage tank. This permits platform 14 to move up and down with a truck bed as it is loaded or unloaded, with supporting structure 58 following closely under it by the loosely hanging connection provided by slotted couplings 84 and 86 on rear and front lateral support bars 62 and 60 to lower flanges 21 of stringers 16. If the truck should suddenly drive away from under ramp 10, the weight of platform 14 reacting through elevating linkage 64 forces switch 74 against the bias of spring 78 into contact with plate 76 thereby opening switch 74 and accordingly causing check valve 108 to close and hydraulically lock ramp 10 and hold it in position. This prevents the platform from suddenly dropping and being damaged if a truck should suddenly drive away from under it.

What is claimed is:

1. A power-operated ramp for a loading dock comprising a relatively flexible platform having a number of parallel longitudinal stringers, which are vertically relatively movable, a lip assembly extending across the front ends of said stringers, loose pin means connecting lip assembly to the front ends of said stringers to make said lip assembly flexibly adjustable to the level of a surface upon which it rests, a deck upon said platform, loose clip means connecting said deck upon said stringers to cause said deck to freely adjust to positions to which said stringers move in accordance with the level of said lip assembly, a supporting structure mounted under said platform, hinge means rotatably connecting the rear of said supporting structure to the edge of said loading dock, power-operated elevating means reacting between said loading dock and said supporting structure for raising and lowering it and said platform resting upon it, a bridging plate, hinge means connecting said bridging plate to the edge of said loading dock for bridging the space between the rear of said platform and said loading dock, loose slotted coupling means connecting the rear ends of said stringers to a rear portion of said supporting structure to make said platform movable toward and away from said loading dock, and power-operated extending means reacting between said supporting structure and said platform for extending and retracting said ramp.

2. A ramp as set forth in claim 1 wherein said supporting structure comprises a front lateral support bar mounted under a front section of said platform, a frame secured to said loading dock, a movable linkage mounting said bar upon said frame, said power-operated elevating means reacting between said frame and said linkage for moving said bar up and down to raise and lower said ramp, a pair of longitudinal beams mounted under the sides of said platform between pairs of said longitudinal stringers, the rear ends of said beams being connected to said loading dock by said hinge means of said supporting structure, a rear lateral support bar secured between rear portions of said beams, and said loose slotted coupling means comprising pairs of angle clips mounted upon an upper surface of said rear lateral support bar engaging a flange upon the bottom of said stringers for loosely connecting said stringers to said supporting structure in a manner which permits them and said platform to slide back and forth upon it.

3. A ramp as set forth in claim 2 wherein an auxiliary sliding coupling connects one of said stringers to said front lateral support bar to maintain said supporting structure connected to said platform when the weight of said platform rests upon a surface which it bridges from said loading dock.

4. A ramp as set forth in claim 1 wherein said stringers comprise I-beams having upper and lower flanges, said upper flanges engaging said loose clip means, and said lower flanges engaging said loose slotted coupling means.

5. A ramp as set forth in claim 1 wherein said power-operated elevating means includes a piston and cylinder asesmbly, a frame secured to said loading dock, a link connecting said piston and cylinder assembly to said frame, a control switch mounted upon said link in a position to be actuated by said supporting frame; when the weight of said ramp is supported upon said power-operated elevating means, said switch being connected in the central circuit of said power-operating elevating means for inactivating it when said ramp is supported upon a surface, and a spring reacting between said link and said frame for moving said switch away from said frame into the unactuated position when said ramp is supported upon said surface thereby causing said power-operated elevating means to float while said platform is supported upon said surface.

6. A ramp as set forth in claim 1 wherein said loose pin means incorporates pins secured to lower portions of said lip assembly extending through oversize holes in the lower portions of the front ends of said longitudinal stringers, and a pair of upper loose pin means connecting the upper portions of said lip assemblies to the upper portions of the two outside stringers.

7. A ramp as set forth in claim 6 wherein said lip assembly comprises an angular lip element having a horizontal lip plate which rests upon a bridge surface and a vertical plate to which said longitudinal stringers are connected, and a transition plate being mounted upon an upper surface of said lip plate to provide a smooth continuation from said deck mounted behind it to said lip plate.

8. A ramp as set forth in claim 1 wherein said stringers have flanged upper portions, said loose clip means connecting said deck to said stringers comprises clips secured to the bottom of said deck and extending under upper portions of said longitudinal stringers.

9. A ramp as set forth in claim 8 wherein the side edges of said deck are secured to the two of said outside stringers.

References Cited by the Examiner

UNITED STATES PATENTS

| | | | |
|---|---|---|---|
| 2,547,460 | 4/1951 | Hamilton | 14—71 |
| 2,639,450 | 5/1953 | Ramer | 14—71 |
| 2,677,141 | 5/1954 | Senn | 14—71 |
| 2,689,965 | 9/1954 | Fenton | 14—71 |
| 2,714,735 | 8/1955 | Watson | 14—71 |
| 2,751,615 | 6/1956 | Kelley | 14—71 |
| 2,881,457 | 4/1959 | Rodgers | 14—71 |
| 2,993,219 | 7/1961 | Pennington | 14—71 |
| 3,175,238 | 3/1965 | Pennington | 14—71 |

CHARLES E. O'CONNELL, *Primary Examiner.*

HENRY C. SUTHERLAND, *Examiner.*